United States Patent
Middleton et al.

(10) Patent No.: US 8,526,817 B2
(45) Date of Patent: Sep. 3, 2013

(54) COMMUNICATIONS DEVICE WITH DISCRIMINATOR FOR GENERATING INTERMEDIATE FREQUENCY SIGNAL AND RELATED METHODS

(75) Inventors: Charles Middleton, Rockledge, FL (US); Richard DeSalvo, Satellite Beach, FL (US); Scott L. Meredith, Vero Beach, FL (US); Robert C. Peach, Rockledge, FL (US)

(73) Assignee: Harris Corporation, Melbourne, FL (US)

( * ) Notice: Subject to any disclaimer, the term of this patent is extended or adjusted under 35 U.S.C. 154(b) by 96 days.

(21) Appl. No.: 13/356,773

(22) Filed: Jan. 24, 2012

(65) Prior Publication Data
US 2013/0188962 A1    Jul. 25, 2013

(51) Int. Cl.
  *H04J 14/00* (2006.01)
  *H04B 10/04* (2011.01)
  *H04B 10/12* (2011.01)

(52) U.S. Cl.
  USPC ............. 398/66; 398/183; 398/185; 398/192; 398/198

(58) Field of Classification Search
  USPC .................................. 398/183, 185, 192, 198
  See application file for complete search history.

(56) References Cited

U.S. PATENT DOCUMENTS

| | | | |
|---|---|---|---|
| 2,121,103 A | 6/1938 | Seeley | 250/20 |
| 4,794,351 A | 12/1988 | Darcie | 332/7.51 |
| 5,359,412 A | 10/1994 | Schulz | 356/345 |
| 5,710,651 A | 1/1998 | Logan, Jr. | 359/145 |
| 5,859,611 A | 1/1999 | Lam et al. | 342/368 |
| 5,940,196 A * | 8/1999 | Piehler et al. | 398/91 |
| 6,246,500 B1 | 6/2001 | Ackerman | 359/161 |
| 6,256,130 B1 | 7/2001 | Bülow | 359/173 |
| 6,256,137 B1 | 7/2001 | Hironishi | 359/332 |
| 6,476,957 B1 | 11/2002 | Ward et al. | 359/326 |
| 6,594,070 B2 | 7/2003 | Sugata et al. | 359/326 |
| 6,643,417 B2 | 11/2003 | Strutz et al. | 385/1 |
| 6,697,576 B1 | 2/2004 | Rollins et al. | 398/159 |
| 7,076,170 B2 | 7/2006 | Choa | 398/115 |
| 7,079,780 B1 | 7/2006 | Rollins | 398/198 |
| 7,359,580 B2 | 4/2008 | Darcie et al. | 385/3 |

(Continued)

OTHER PUBLICATIONS

"A photonic chip based frequency discriminator for a high performance microwave photonic link" (Published in Optics Express vol. 18, No. 26, Dec. 20, 2010).*

(Continued)

*Primary Examiner* — M. R. Sedighian
*Assistant Examiner* — Casey Kretzer
(74) *Attorney, Agent, or Firm* — Allen, Dyer, Doppelt, Milbrath & Gilchrist, P.A.

(57) ABSTRACT

A communications device includes a transmitter device having an optical source to generate an optical carrier signal, and a first modulator coupled to the optical source and to modulate the optical carrier signal with a radio frequency (RF) input signal, and an optical waveguide coupled to the transmitter device. The communications device includes a receiver device coupled to the optical waveguide and including a second modulator to further modulate the modulated optical carrier signal with a local oscillator (LO) signal, a frequency modulation-phase modulation (FM-PM) discriminator coupled to the second modulator and to convert the modulated optical carrier signal to an intensity modulated optical carrier signal based upon the LO signal, and an optical-to-electrical converter coupled to the FM-PM discriminator and to generate an intermediate frequency (IF) signal based upon the intensity modulated optical carrier signal.

21 Claims, 5 Drawing Sheets

(56) References Cited

U.S. PATENT DOCUMENTS

| | | | |
|---|---|---|---|
| 7,369,715 B2 | 5/2008 | Darcie et al. | 385/3 |
| 7,555,217 B2 | 6/2009 | Hillis et al. | 398/115 |
| 7,657,179 B2 | 2/2010 | Mahgerefteh et al. | 398/82 |
| 7,813,654 B1 | 10/2010 | Ng et al. | 398/198 |
| 7,825,364 B1 | 11/2010 | Hillis et al. | 250/208.2 |
| 2008/0212974 A1 | 9/2008 | Davies et al. | 398/140 |
| 2009/0214203 A1* | 8/2009 | Hoshida et al. | 398/33 |

OTHER PUBLICATIONS

Marpaung et al, A photonic chip based frequency discriminator for a high performance microwave photonic link (Published in Optics Express vol. 18, No. 26, Dec. 20, 2010).*

Yamamoto et al, Coherent Optical Fiber Transmission Systems (Published in IEEE Journal of Quantum Electronics, vol. QE-17, No. 6, Jun. 1981).*

Darcie et al., "Class-B Microwave-Photonic Link Using Optical Frequency Modulation and Linear Frequency Discriminators," Journal of Lightwave Technology, vol. 25, No. 1, Jan. 2007, pp. 157-164.

Wyrwas et al., "Dynamic Range of Frequency Modulated Direct-Detection Analog Fiber Optic Links," Journal of Lightwave Technology, vol. 27, No. 24, Dec. 2009, pp. 5552-5562.

Marpaung et al., "A photonic chip based frequency discriminator for a high performance microwave photonic link," Optic Express, vol. 18, No. 26, Dec. 20, 2010, pp. 27359-27370.

Marpaung et al., "Design and Realization of an Integrated Optical Frequency Modulation Discriminator for a High Performance Microwave Photonic Link," Telecommunications Engineering Group, University of Twente, Enschede, The Netherlands, pp. 131-134.

* cited by examiner

COMMUNICATIONS DEVICE WITH DISCRIMINATOR FOR GENERATING INTERMEDIATE FREQUENCY SIGNAL AND RELATED METHODS

FIELD OF THE INVENTION

The present invention relates to the field of communications, and, more particularly, to optical frequency conversion and related methods.

BACKGROUND OF THE INVENTION

A typical wireless communication system comprises a plurality of wireless communications devices exchanging data with each other. In some wireless communication systems, for example, infrastructure networks, the system may further comprise a wireless base station for managing communications between the wireless communications devices. In other words, each intra-system communication would be exchanged via the wireless base station. In other wireless communication systems, for example, mesh networks and ad hoc wireless networks, the wireless base station may be omitted, i.e. the wireless communications devices may communicate directly with each other.

In certain high frequencies, such as the Extremely High Frequency (EHF) band, i.e. 30 to 300 GHz, a communication system operating at this band may have some drawbacks. For example, transmission of the signals over coaxial cable may incur large attenuation effects. In these applications, an inline amplifier may be required to compensate for this attenuation. Moreover, in applications where RF devices are used, the size, weight, and power (SWaP) of the components may increase to undesirable levels. Moreover, downstream receiver processing, such as downconverting, and signal addressing may be difficult. In particular, the linearity of the downstream processing may become poor.

One approach to these drawbacks in EHF communication systems may comprise the use of optical components for processing components. An advantage of such systems may comprise the ability to transmit high frequency signals from a remote location without the degradation of the signal incumbent in RF applications.

For example, as disclosed in U.S. Pat. No. 5,710,651 to Logan, Jr., an EHF communication system comprises a remote antenna station, a transmitter/receiver station, and an optical fiber coupling the stations together. These stations comprise photodiodes for converting the transmitted optical signal to an electrical signal, and lasers paired with optical modulators for converting the received EHF signal to an optical signal.

Nevertheless, optical applications such as this may be subject to certain drawbacks. For example, the systems may be subject to chromatic dispersion-induced signal fading. In particular, optical heterodyne approaches may be limited by phase noise of laser sources.

SUMMARY OF THE INVENTION

In view of the foregoing background, it is therefore an object of the present invention to provide a communications device that provides robust frequency conversion.

This and other objects, features, and advantages in accordance with the present invention are provided by a communications device comprising a transmitter device comprising an optical source configured to generate an optical carrier signal, and a first modulator coupled to the optical source and configured to modulate the optical carrier signal with a radio frequency (RF) input signal. The communications device includes an optical waveguide coupled to the transmitter device, and a receiver device coupled to the optical waveguide. The receiver device includes a second modulator configured to further modulate the modulated optical carrier signal with a local oscillator (LO) signal, a frequency modulation-phase modulation (FM-PM) discriminator coupled to the second modulator and configured to convert the modulated optical carrier signal to an intensity modulated optical carrier signal based upon the LO signal, and an optical-to-electrical converter coupled to the FM-PM discriminator and configured to generate an intermediate frequency (IF) signal based upon the intensity modulated optical carrier signal. Advantageously, the RF input signal may be converted with greater linearity than in typical devices.

Another aspect is directed to a method of frequency converting a radio RF input signal. The method comprises modulating an optical carrier signal with the RF input signal using a first modulator, further modulating the modulated optical carrier signal with an LO signal using a second modulator, converting the modulated optical carrier signal into an intensity modulated optical carrier signal based upon the LO signal and using a FM-PM discriminator coupled to the second modulator, and converting the intensity modulated optical carrier signal into an IF electrical signal.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
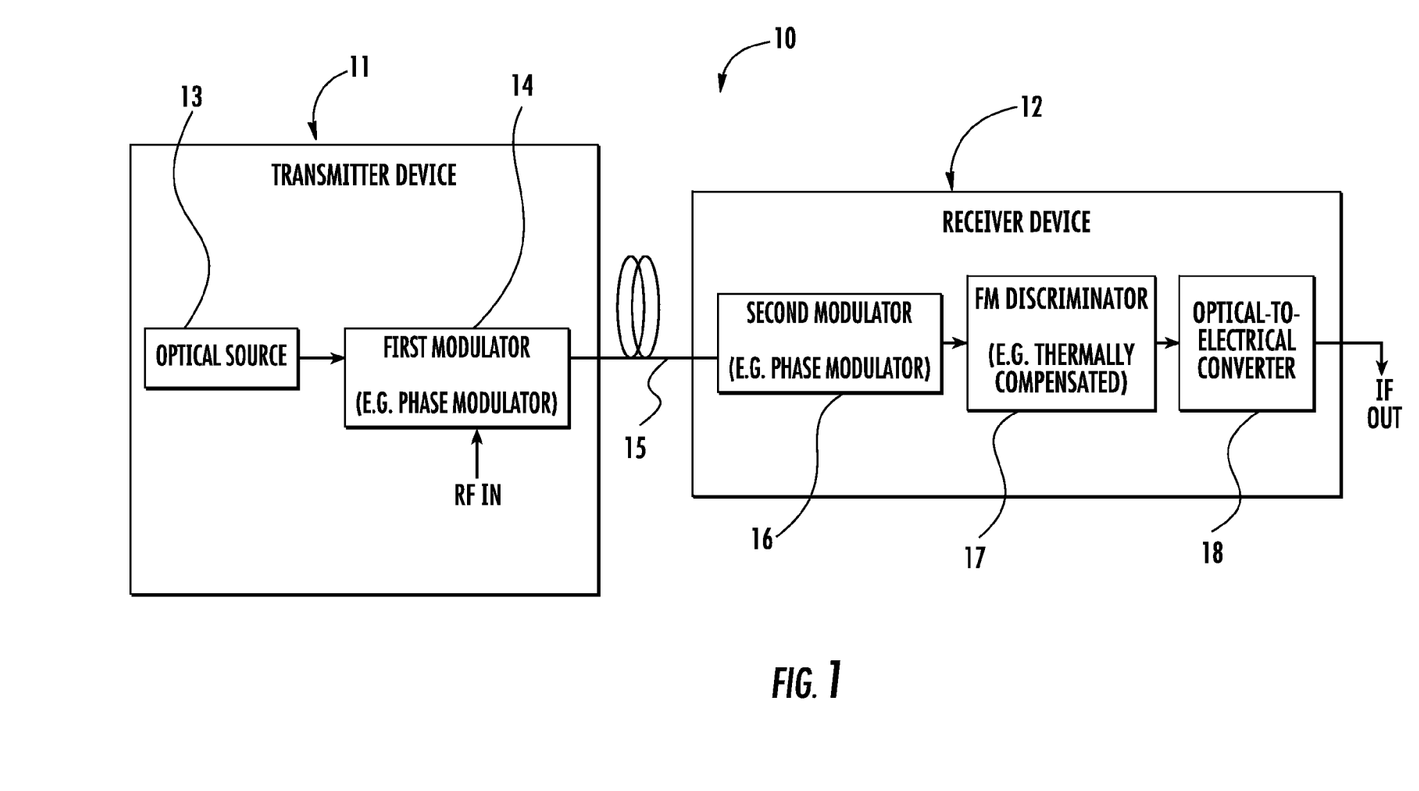
FIG. 1 is a schematic diagram of a communications device, according to the present invention.
Figure 2:
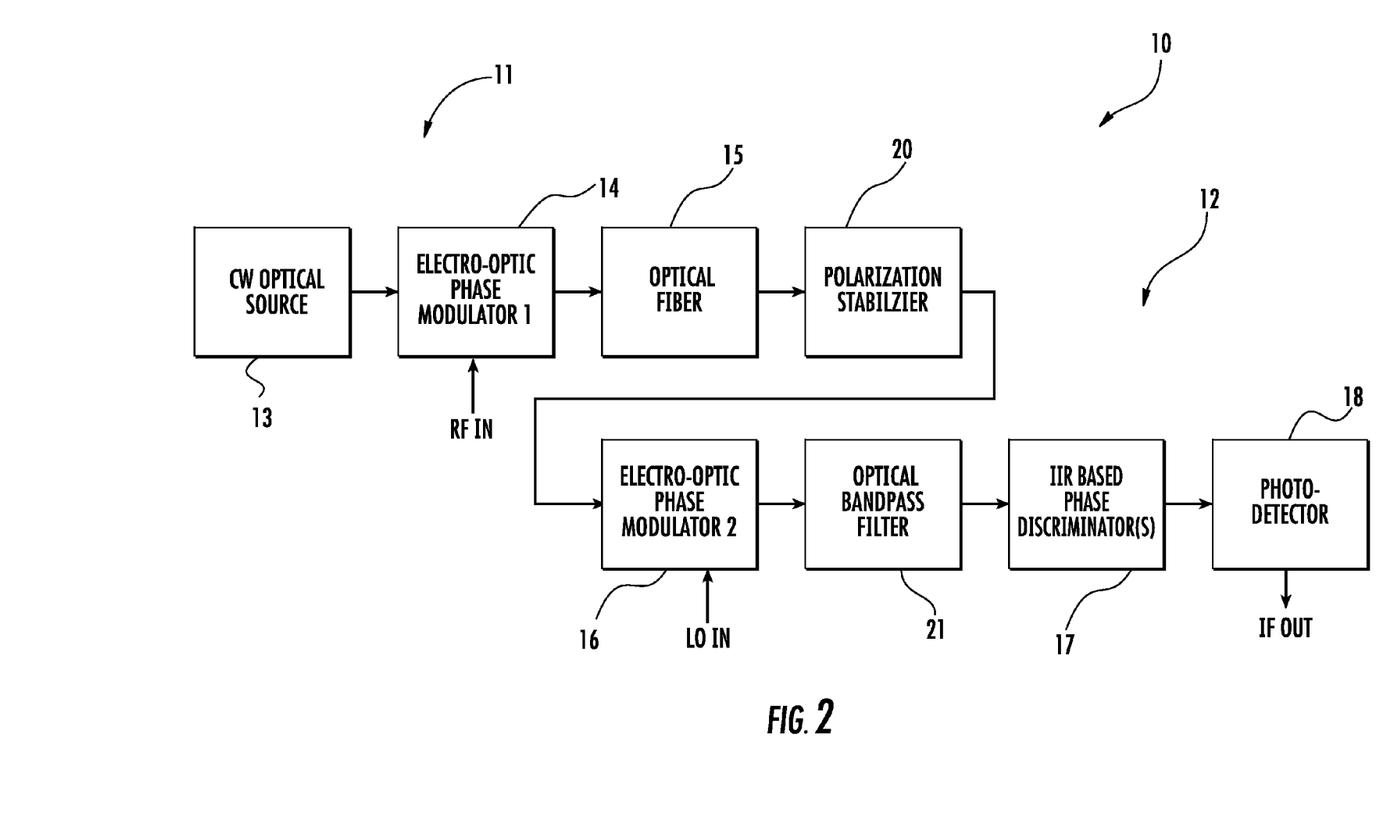
FIG. 2 is a more detailed schematic diagram of the communications device of FIG. 1.

Referring initially to FIGS. 1-2, a communications device 10 according to the present invention is now described. The communications device 10 includes a transmitter device 11, a receiver device 12, and an optical waveguide 15 coupling the two devices together. For example, the optical waveguide 15 may comprise an optical fiber (single-mode), and should be largely frequency independent. In certain embodiments, due to the advantageous low loss of the optical waveguide 15, the length of the optical waveguide may be several miles long, thereby making the communications device 10 applicable in remoting applications.

The transmitter device 11 includes an optical source 13 configured to generate an optical carrier signal. For example, the optical source 13 may comprise a CW laser. The transmitter device 11 includes a first modulator 14 coupled to the optical source 13 and configured to modulate the optical carrier signal with an RF input signal. Depending on the application, the RF input signal may be generated locally at the transmitter device 11 by an RF antenna, for example, and may comprise a variety of higher frequency signals, such as a μm wave signal, a mm wave signal, etc.

The receiver device 12 includes a second modulator 16 configured to further modulate the modulated optical carrier signal with an LO signal. For example, the first and second modulators 14, 16 may each comprise an EO phase modulator. The receiver device 12 includes a FM-PM discriminator 17 coupled to the second modulator 16 and configured to convert the modulated optical carrier signal to an intensity modulated optical carrier signal based upon the LO signal, in particular, the sidebands of the LO signal. For example, the FM-PM discriminator 17 may have a transfer function comprising an IIR filter.

The FM-PM discriminator 17 is linearized based upon the IIR filter and is configured to use an LO sideband as the optical carrier for converting the phase-modulated optical signal to a linearized intensity-modulated optical signal. In some embodiments, the FM-PM discriminator 17 may be thermally compensated as described in Marpaung et al., "A photonic chip based frequency discriminator for a high performance microwave photonic link," Optics Express, Vol. 18, No. 26, 2010, the contents of which are hereby incorporated by reference in their entirety.

The receiver device 12 includes an optical-to-electrical converter 18 coupled to the FM-PM discriminator 17 and configured to generate an IF signal based upon the intensity modulated optical carrier signal. For example, the optical-to-electrical converter 18 may comprise a photodiode device.

The receiver device 12 illustratively includes a polarization stabilizing module 20 coupled between the optical waveguide 15 and the second modulator 16. In the alternative, the optical waveguide 15 may comprise polarization maintaining optical fiber. The polarization stabilizing module 20 is configured to align the polarization state of the modulated optical carrier signal. Additionally, the receiver device 12 illustratively includes an optical band pass filter 21 coupled between the second modulator 16 and the FM-PM discriminator 17. For example, the optical band pass filter 21, and the FM-PM discriminator 17 may comprise bulk optical components or a planar lightwave circuit (PLC).

Another aspect is directed to a method of frequency converting a radio RF input signal. The method comprises modulating an optical carrier signal with the RF input signal using a first modulator 14, further modulating the modulated optical carrier signal with an LO signal using a second modulator 16, converting the modulated optical carrier signal into an intensity modulated optical carrier signal based upon the LO signal and using a FM-PM discriminator 17 coupled to the second modulator, and optical-to-electrical converting the intensity modulated optical carrier signal into an IF signal.

Figure 3:
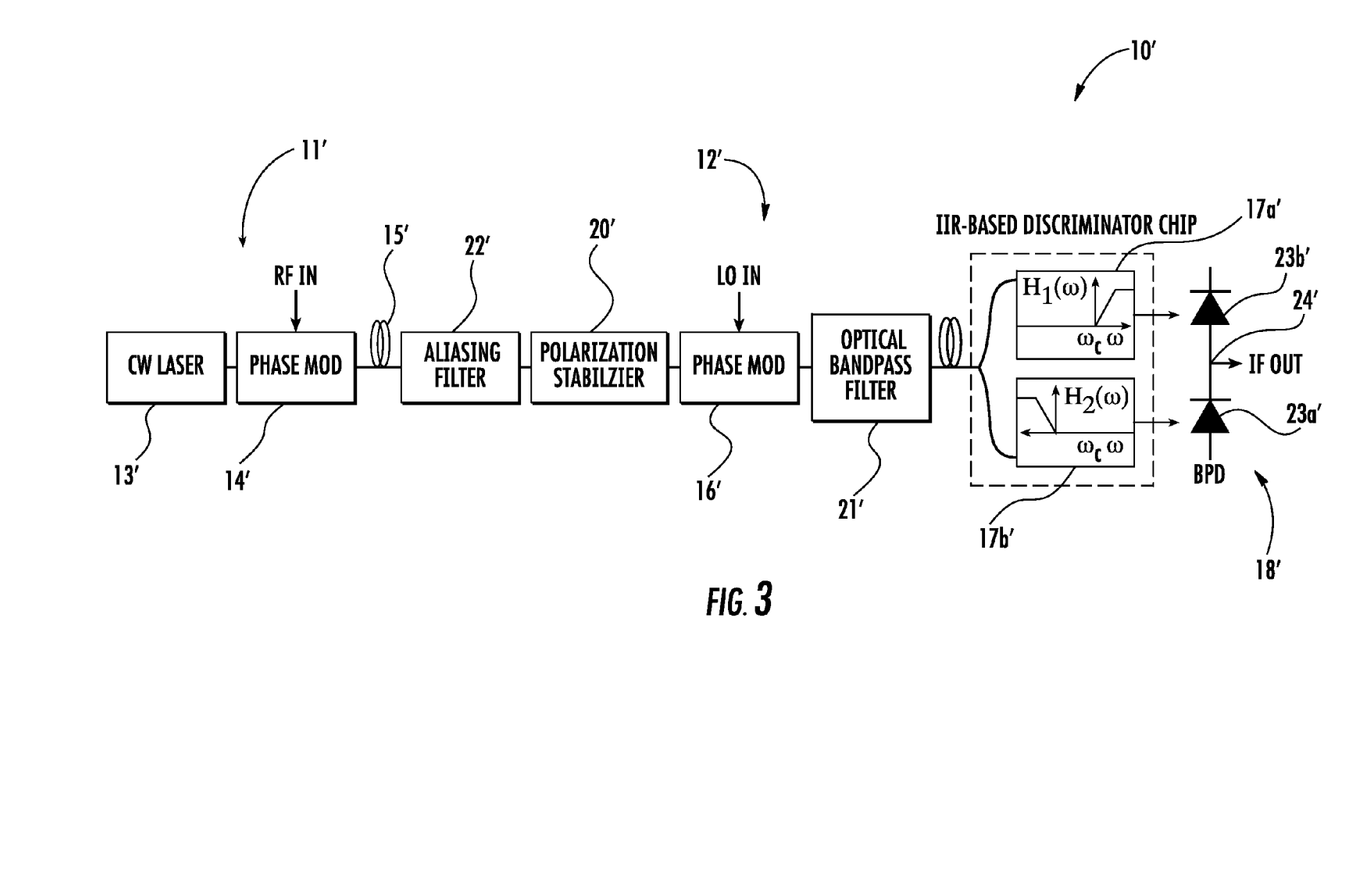
FIG. 3 is a schematic diagram of another embodiment of the communications device, according to the present invention.

Referring now to FIG. 3, another embodiment of the communications device 10' is now described. In this embodiment of the communications device 10', those elements already discussed above with respect to FIGS. 1-2 are given prime notation and most require no further discussion herein. This embodiment differs from the previous embodiment in that the receive device 12' further includes an anti-aliasing filter 22' coupled upstream of the polarization stabilizer module 20' that is configured to avoid mixing products between the LO input and the RF input. In this embodiment, the FM-PM discriminator illustratively includes a pair 17a'-17b' thereof coupled in parallel. The FM-PM discriminators 17a'-17b' each include slopes of opposite sign. Moreover, the optical-to-electrical converter 18' illustratively includes first and second waveguide paths respectively coupled to the pair of FM-PM discriminators 17a'-17b', first and second optical detectors 23a'-23b' coupled to the first and second waveguide paths, and a combiner 24' coupled to the first and second optical detectors, i.e. this embodiment includes balanced optical detection rather than single-ended detection (FIGS. 1-2).

Advantageously, the communications device 10 may enable simultaneous linearization and down-conversion of high frequency signals, such as EHF/VHF signals. The communications device 10 may provide an approach to the problem of phase noise experienced in typical heterodyne devices. Also, chip-scale integration of the receiver device 12 may be more readily achieved. The communications device 10 may also provide for high link performance with low optical power at the first and second modulators 14, 16, thereby reducing power consumption for remoting applications and providing access to a wider range of modulator material systems. Of course, the communications device 10 may provide improved linearity over the typical device due to the IIR filter filter-based FM-PM discriminator 17. Yet further power reduction may be achieved since the first and second phase modulators 14, 16 do not require an active power source.

Figure 4:
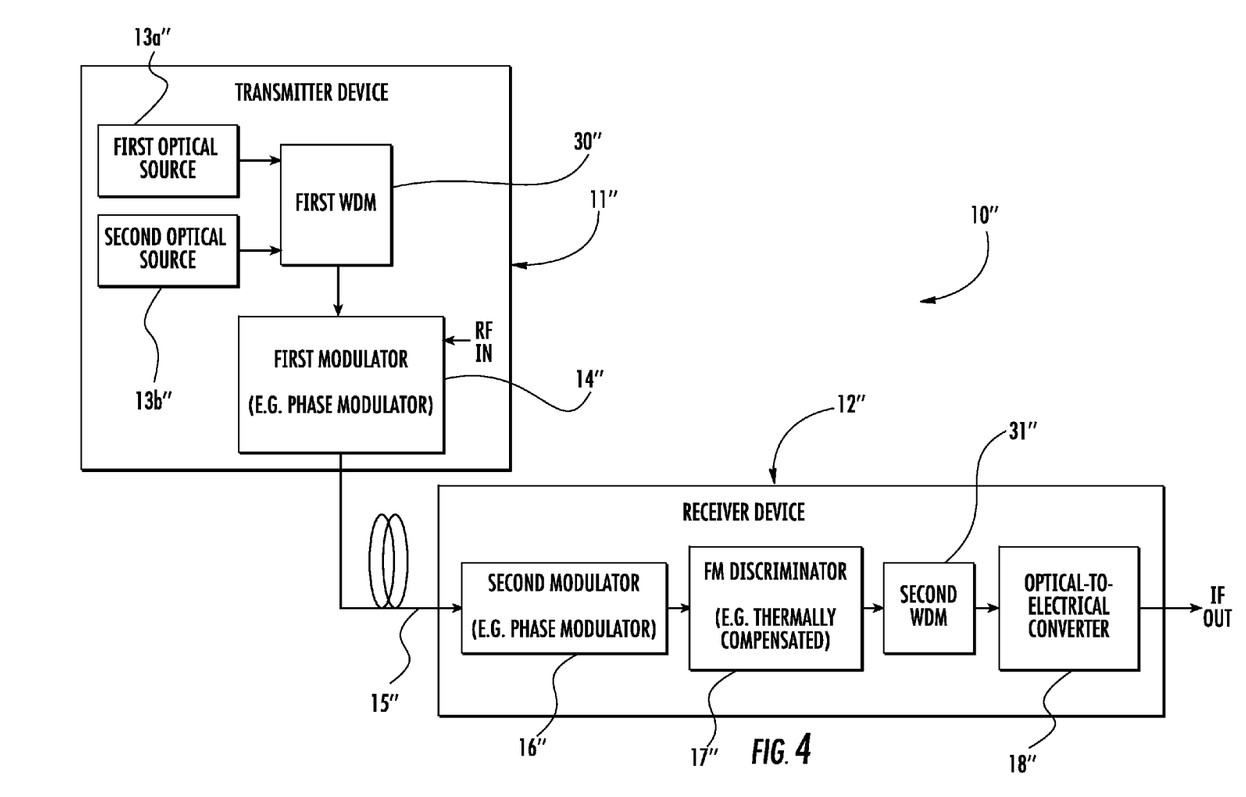
FIG. 4 is a schematic diagram of a communications device, according to the present invention.
Figure 5:
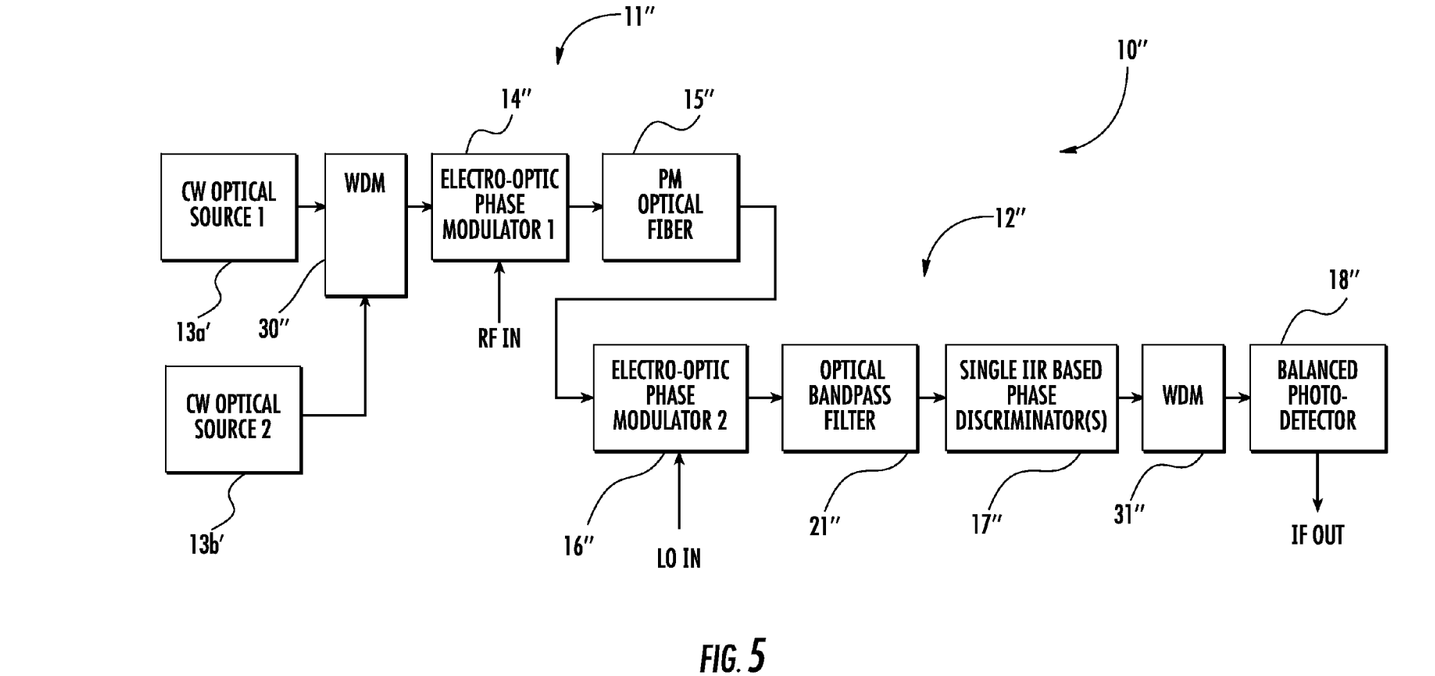
FIG. 5 is a more detailed schematic diagram of the communications device of FIG. 4.

Referring now to FIGS. 4-5, another embodiment of the communications device 10" is now described. In this embodiment of the communications device 10", those elements already discussed above with respect to FIGS. 1-3 are given double prime notation and most require no further discussion herein. This embodiment differs from the previous embodiment in that the transmitter device 11" illustratively includes first and second optical sources 13a"-13b" configured to generate first and second optical carrier signals at respective different first and second optical wavelengths, a first wavelength division multiplexer (WDM) 30" coupled to the first and second optical sources, and a first modulator 14" coupled to the first WDM and configured to modulate a combined carrier signal comprising the first and second optical carrier signals with an RF input signal. In short, the first WDM 30" is multiplexing the first and second optical carrier signals into a combined optical carrier signal. Alternatively, an optical coupler may be used instead of a WDM combining device for the purpose of combining the two optical carrier signals.

The receiver device 12" illustratively includes a second modulator 16" configured to further modulate the modulated combined carrier signal with an LO signal, and a FM-PM discriminator 17" coupled to the second modulator and configured to convert the modulated combined carrier signal to an intensity modulated combined carrier signal based upon the LO signal. The receiver device 12" illustratively includes a second WDM 31" coupled to the FM-PM discriminator 17" and configured to generate first and second intensity modulated carrier signals, and an optical-to-electrical converter 18" coupled to the second WDM and configured to generate an IF signal based upon the first and second intensity modulated carrier signals. In other embodiments, the second WDM 31" may also alternatively comprise another optical coupler type, such as a fiber Bragg grating (FBG).

The FM-PM discriminator 17" may have a transfer function, again defining an IIR filter. The first and second optical sources 13a"-13b" are configured to position the first and second carrier frequencies of the first and second optical carrier signals on first and second portions, i.e. portions of the transfer function that have opposite slopes, of the transfer function of the FM-PM discriminator 17", thereby emulating the effect of two FM-PM discriminators (FIG. 3). In this embodiment, balanced photo detection is again applied since the second WDM 31" separates the modulated signals at differing wavelengths.

Another aspect is directed to a method of frequency converting an RF input signal. The method includes generating first and second optical carrier signals at respective different first and second optical wavelengths, multiplexing the first and second optical carrier signals with a first WDM 30", and modulating a combined carrier signal comprising the first and second optical carrier signals with the RF input signal. The method further includes further modulating the modulated combined carrier signal with an LO signal, converting the modulated combined carrier signal to an intensity modulated combined carrier signal based upon the LO signal and using a FM-PM discriminator 17", using a second WDM 31" coupled to the FM-PM discriminator to generate first and second intensity modulated carrier signals, and optical-to-electrical converting the first and second intensity modulated carrier signals into an IF signal.

Advantageously, the embodiments of FIGS. 4-5 may reduce power consumption by approximately 45%. Also, the complexity and the control of the FM-PM discriminator 17" may be reduced, by leveraging the control of the first and second optical sources 13a"-13b", which are a much more mature, cheaper, and readily configured technology (as compared to the discriminator).

Other features relating to communications devices are disclosed in co-pending applications: "PHOTONIC COMMUNICATIONS DEVICE WITH AN FM/PM DISCRIMINATOR AND RELATED METHODS,", U.S. patent application Ser. No. 13/228,976; "COMMUNICATIONS DEVICE WITH DISCRIMINATOR FOR GENERATING INTERMEDIATE FREQUENCY SIGNAL AND RELATED METHODS," and application Ser. No. 13/356,807, all incorporated herein by reference in their entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
    a transmitter device comprising an optical source configured to generate an optical carrier signal, and a first modulator coupled to said optical source and configured to modulate the optical carrier signal with a radio frequency (RF) input signal;
    an optical waveguide coupled to said transmitter device; and
    a receiver device coupled to said optical waveguide and comprising
        a second modulator configured to further modulate the modulated optical carrier signal with a local oscillator (LO) signal,
        a frequency modulation-phase modulation (FM-PM) discriminator coupled to said second modulator and configured to convert the modulated optical carrier signal to an intensity modulated optical carrier signal based upon the LO signal, and
        an optical-to-electrical converter coupled to said FM-PM discriminator and configured to generate an intermediate frequency (IF) signal based upon the intensity modulated optical carrier signal.

2. The communications device of claim 1 wherein said FM-PM discriminator comprises a thermally compensated FM-PM discriminator.

3. The communications device of claim 1 wherein said FM-PM discriminator has a transfer function comprising an infinite impulse response (IIR) filter.

4. The communications device of claim 1 wherein said receiver device comprises a polarization stabilizing module coupled between said optical waveguide and said second modulator.

5. The communications device of claim 1 wherein said FM-PM discriminator comprises a pair thereof.

6. The communications device of claim 5 wherein said optical-to-electrical converter comprises:
    first and second waveguide paths respectively coupled to said pair of FM-PM discriminators;
    first and second optical detectors coupled to said first and second waveguide paths; and
    a combiner coupled to said first and second optical detectors.

7. The communications device of claim 1 wherein said first and second modulators each comprises an electro-optic (EO) phase modulator.

8. The communications device of claim 1 wherein said receiver device comprises an optical band pass filter coupled between said second modulator and said FM-PM discriminator.

9. The communications device of claim 1 wherein said optical source comprises a continuous wave (CW) laser.

10. A communications device comprising:
    a transmitter device comprising an optical source configured to generate an optical carrier signal, and a first modulator coupled to said optical source and configured to modulate the optical carrier signal with a radio frequency (RF) input signal;
    an optical waveguide coupled to said transmitter device; and
    a receiver device coupled to said optical waveguide and comprising
        a second modulator configured to further modulate the modulated optical carrier signal with a local oscillator (LO) signal,
        a pair of frequency modulation-phase modulation (FM-PM) discriminators coupled to said second modulator and configured to convert the modulated optical carrier signal to an intensity modulated optical carrier signal based upon the LO signal, each FM-PM discriminator having a transfer function comprising an infinite impulse response (IIR) filter, and
        an optical-to-electrical converter coupled to said pair of FM-PM discriminators and configured to generate an intermediate frequency (IF) signal based upon the intensity modulated optical carrier signal.

11. The communications device of claim 10 wherein each FM-PM discriminator comprises a thermally compensated FM-PM discriminator.

12. The communications device of claim 10 wherein said receiver device comprises a polarization stabilizing module coupled between said optical waveguide and said second modulator.

13. The communications device of claim 10 wherein said optical-to-electrical converter comprises:
    first and second waveguide paths respectively coupled to said pair of FM-PM discriminators;

first and second optical detectors coupled to said first and second waveguide paths; and a combiner coupled to said first and second optical detectors.

14. The communications device of claim 10 wherein said first and second modulators each comprises an electro-optic (EO) phase modulator.

15. The communications device of claim 10 wherein said receiver device comprises an optical band pass filter coupled between said second modulator and said FM-PM discriminator.

16. A method of frequency converting a radio frequency (RF) input signal, the method comprising:

modulating an optical carrier signal with the RF input signal using a first modulator;

further modulating the modulated optical carrier signal with a local oscillator (LO) signal using a second modulator;

converting the modulated optical carrier signal into an intensity modulated optical carrier signal based upon the LO signal and using a frequency modulation-phase modulation (FM-PM) discriminator coupled to the second modulator; and converting the intensity modulated optical carrier signal into an intermediate frequency (IF) electrical signal.

17. The method of claim 16 wherein using the FM-PM discriminator comprises using a thermally compensated FM-PM discriminator.

18. The method of claim 16 further comprising operating the FM-PM discriminator to have a transfer function comprising an infinite impulse response (IIR) filter.

19. The method of claim 16 further comprising polarization stabilizing the modulated optical carrier signal.

20. The method of claim 16 wherein using the FM-PM discriminator comprises using the FM-PM discriminator comprising a pair thereof.

21. The method of claim 16 further comprising optically band pass filtering the modulated optical carrier signal.

* * * * *